US012750190B2

(12) United States Patent
Caporal Del Barrio et al.

(10) Patent No.: US 12,750,190 B2
(45) Date of Patent: Sep. 29, 2026

(54) SOUNDING REFERENCE SIGNAL GROUPING AND VALIDITY

(71) Applicant: Nokia Technologies Oy, Espoo (FI)

(72) Inventors: Samantha Caporal Del Barrio, Aalborg (DK); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 290 days.

(21) Appl. No.: 18/562,056

(22) PCT Filed: May 25, 2022

(86) PCT No.: PCT/EP2022/064151
§ 371 (c)(1),
(2) Date: Nov. 17, 2023

(87) PCT Pub. No.: WO2022/258372
PCT Pub. Date: Dec. 15, 2022

(65) Prior Publication Data

US 2024/0243877 A1 Jul. 18, 2024

Related U.S. Application Data

(60) Provisional application No. 63/209,633, filed on Jun. 11, 2021.

(51) Int. Cl.
*H04L 5/00* (2006.01)
*H04B 7/06* (2006.01)
*H04W 52/36* (2009.01)

(52) U.S. Cl.
CPC ......... *H04L 5/0051* (2013.01); *H04B 7/0626* (2013.01); *H04W 52/367* (2013.01)

(58) Field of Classification Search
CPC ... H04B 7/0626; H04L 5/0051; H04L 5/0057; H04L 5/0091; H04W 52/367
See application file for complete search history.

(56) References Cited

U.S. PATENT DOCUMENTS

2019/0116605 A1 4/2019 Luo et al.
2020/0413416 A1 12/2020 Jiang et al.
(Continued)

FOREIGN PATENT DOCUMENTS

WO 2020/075090 A1 4/2020
WO WO-2020/068467 A1 4/2020
(Continued)

OTHER PUBLICATIONS

"3rd Generation Partnership Project; Technical Specification Group Radio Access Network; NR; Physical layer procedures for control (Release 16)", 3GPP TS 38.213, V16.5.0, Mar. 2021, pp. 1-183.
(Continued)

*Primary Examiner* — Mansour Oveissi
(74) *Attorney, Agent, or Firm* — McCarter & English, LLP

(57) ABSTRACT

Systems, methods, apparatuses, and computer program products for sounding reference signal grouping and validity. The method may include receiving, from a network element, a request to perform a sounding reference signal sweep. The method may also include performing the sounding reference signal sweep of a plurality of sounding reference signals. The method may further include creating one or more groups including one or more sounding reference signals among the plurality of sounding reference signals, or receiving an indication of one or more groups including one or more sounding reference signals among the plurality of sounding reference signals. The method may also include
(Continued)

transmitting another indication to the network element, or receiving the another indication from the network element.

20 Claims, 6 Drawing Sheets

(56) References Cited

U.S. PATENT DOCUMENTS

| | | | | |
|---|---|---|---|---|
| 2021/0111847 | A1 | 4/2021 | Yang et al. | |
| 2021/0211329 | A1* | 7/2021 | Wu | H04L 25/0226 |
| 2024/0014875 | A1* | 1/2024 | Yuan | H04W 16/28 |

FOREIGN PATENT DOCUMENTS

| | | | |
|---|---|---|---|
| WO | 2020/204675 | A1 | 10/2020 |
| WO | 2020/248158 | A1 | 12/2020 |
| WO | 2021/227055 | A1 | 11/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"3rd Generation Partnership Project; Technical Specification Group Radio Access Network; NR; Requirements for support of radio resource management (Release 17)", 3GPP TS 38.133, V17.1.0, Mar. 2021, 2172 pages.
"3rd Generation Partnership Project; Technical Specification Group Radio Access Network; NR; Physical layer procedures for data (Release 16)", 3GPP TS 38.214, V16.4.0, Dec. 2020, pp. 1-169.
"Power control on different SRS groups", 3GPP TSG RAN WG1 Meeting #90, R1-1714384, Agenda: 6.1.7.2, ASUSTeK, Aug. 21-25, 2017, 2 pages.
International Search Report and Written Opinion received for corresponding Patent Cooperation Treaty Application No. PCT/EP2022/064151, dated Sep. 27, 2022, 12 pages.
Office action received for corresponding European Patent Application No. 22732924.0, dated Jul. 3, 2025, 6 pages.
European Office Action, dated May 4, 2026 (5 pages).

* cited by examiner

SOUNDING REFERENCE SIGNAL GROUPING AND VALIDITY

RELATED APPLICATION

This application claims priority to PCT Application No. PCT/EP2022/064151 filed May 25, 2022, which claims priority benefit from U.S. Provisional Application No. 63/209,633 filed Jun. 11, 2021 which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for sounding reference signal grouping and validity.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving, from a network element, a request to perform a sounding reference signal sweep. The method may also include performing the sounding reference signal sweep of a plurality of sounding reference signals. The method may further include creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the method may include transmitting another indication to the network element, or receiving the another indication from the network element. In certain example embodiments, the another indication may identify which of the one or more sounding reference signals or which of the one or more groups is invalid.

Other example embodiments may be directed to an apparatus. The apparatus may include at least one processor and at least one memory including computer program code. The at least one memory and computer program code may also be configured to, with the at least one processor, cause the apparatus at least to receive, from a network element, a request to perform a sounding reference signal sweep. The apparatus may also be caused to perform the sounding reference signal sweep of a plurality of sounding reference signals. The apparatus may further be caused to create one or more groups including one or more sounding reference signals among the plurality of sounding reference signals, or receive an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the apparatus may be caused to transmit another indication to the network element, or receive the another indication from the network element. In certain example embodiments, the another indication may identify which of the one or more sounding reference signals or which of the one or more groups is invalid.

Other example embodiments may be directed to an apparatus. The apparatus may include means for receiving, from a network element, a request to perform a sounding reference signal sweep. The apparatus may also include means for performing the sounding reference signal sweep of a plurality of sounding reference signals. The apparatus may further include means for creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the apparatus may include means for transmitting another indication to the network element, or receiving the another indication from the network element. In certain example embodiments, the another indication may identify which of the one or more sounding reference signals or which of the one or more groups is invalid.

In accordance with other example embodiments, a non-transitory computer readable medium may be encoded with instructions that may, when executed in hardware, perform a method. The method may include receiving, from a network element, a request to perform a sounding reference signal sweep. The method may also include performing the sounding reference signal sweep of a plurality of sounding reference signals. The method may further include creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the method may include transmitting another indication to the network element, or receiving the another indication from the network element. In certain example embodiments, the another indication may identify which of the one or more sounding reference signals or which of the one or more groups is invalid.

Other example embodiments may be directed to a computer program product that performs a method. The method may include receiving, from a network element, a request to perform a sounding reference signal sweep. The method may also include performing the sounding reference signal sweep of a plurality of sounding reference signals. The method may further include creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the method may include transmitting another indication to the network element, or receiving the another indication from the network element. In certain example embodiments, the another indication may identify which of the one or more sounding reference signals or which of the one or more groups is invalid.

Other example embodiments may be directed to an apparatus that may include circuitry configured to receive, from a network element, a request to perform a sounding reference signal sweep. The apparatus may also include circuitry configured to perform the sounding reference signal sweep of a plurality of sounding reference signals. The apparatus may further include circuitry configured to create one or more groups including one or more sounding reference signals among the plurality of sounding reference signals, or receive an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, the apparatus may include circuitry configured to transmit another indication to the network element, or receiving the another indication from the network element. In certain example embodiments, the another indication may identify which of the one or more sounding reference signals or which of the one or more groups is invalid.

Certain example embodiments may be directed to a method. The method may include transmitting a request to a user equipment to perform a sounding reference signal sweep. The method may also include receiving, from the user equipment, a sounding reference signal sweep result including an identification of a plurality of sounding reference signals identified during the sounding reference signal sweep. The method may further include receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the method may include transmitting another indication to the user equipment, or receiving the another indication from the user equipment. In certain example embodiments, the another indication may identify which of the one or more sounding reference signals or which of the one or more groups is invalid.

Other example embodiments may be directed to an apparatus. The apparatus may include at least one processor and at least one memory including computer program code. The at least one memory and computer program code may be configured to, with the at least one processor, cause the apparatus at least to transmit a request to a user equipment to perform a sounding reference signal sweep. The apparatus may also be caused to receive, from the user equipment, a sounding reference signal sweep result including an identification of a plurality of sounding reference signals identified during the sounding reference signal sweep. The apparatus may further be caused to receive an indication of one or more groups including one or more sounding reference signals among the plurality of sounding reference signals, or form one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the apparatus may be caused to transmit another indication to the user equipment, or receive the another indication from the user equipment. In certain example embodiments, the another indication may identify which of the one or more sounding reference signals or which of the one or more groups is invalid.

Other example embodiments may be directed to an apparatus. The apparatus may include means for transmitting a request to a user equipment to perform a sounding reference signal sweep. The apparatus may also include means for receiving, from the user equipment, a sounding reference signal sweep result including an identification of a plurality of sounding reference signals identified during the sounding reference signal sweep. The apparatus may further include means for receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the apparatus may include means for transmitting another indication to the user equipment, or receiving the another indication from the user equipment. In certain example embodiments, the another indication may identify which of the one or more sounding reference signals or which of the one or more groups is invalid.

In accordance with other example embodiments, a non-transitory computer readable medium may be encoded with instructions that may, when executed in hardware, perform a method. The method may include transmitting a request to a user equipment to perform a sounding reference signal sweep. The method may also include receiving, from the user equipment, a sounding reference signal sweep result including an identification of a plurality of sounding reference signals identified during the sounding reference signal sweep. The method may further include receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the method may include transmitting another indication to the user equipment, or receiving the another indication from the user equipment. In certain example embodiments, the another indication may identify which of the one or more sounding reference signals or which of the one or more groups is invalid.

Other example embodiments may be directed to a computer program product that performs a method. The method may include transmitting a request to a user equipment to perform a sounding reference signal sweep. The method may also include receiving, from the user equipment, a sounding reference signal sweep result including an identification of a plurality of sounding reference signals identified during the sounding reference signal sweep. The method may further include receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the method may include transmitting another indication to the user equipment, or receiving the another indication from the user equipment. In certain example embodiments, the another indication may identify which of the one or more sounding reference signals or which of the one or more groups is invalid.

Other example embodiments may be directed to an apparatus that may include circuitry configured to transmit a request to a user equipment to perform a sounding reference signal sweep. The apparatus may also include circuitry configured to receive, from the user equipment, a sounding reference signal sweep result including an identification of a plurality of sounding reference signals identified during the sounding reference signal sweep. The apparatus may further include circuitry configured to receive an indication of one or more groups including one or more sounding reference signals among the plurality of sounding reference signals, or form one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the apparatus may include circuitry configured to transmit another indication to the user equipment, or receive the another indication from the user equipment. In certain example embodiments, the another indication may identify which of the one or more sounding reference signals or which of the one or more groups is invalid.

BRIEF DESCRIPTION OF THE DRAWINGS

For proper understanding of example embodiments, reference should be made to the accompanying drawings, wherein:

FIG. 9(*b*) illustrates another apparatus, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for sounding reference signal grouping and validity.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Governmental exposure guidelines have been established to prevent health issues due to thermal effects. For instance, the maximum permissible exposure (MPE) is a regulation on power density for the mmWave regime. The Federal Communications Commission (FCC) has set a threshold for MPE at 10 W/m2 (1 mW/cm2). For a certain distance separating the human tissue from the antenna, a power back-off (PBO) is required for FCC compliance with MPE.

When a user is nearly touching the antenna of a communication device (e.g., user equipment f(UE)), the maximum allowed effective, or equivalent, isotropically radiated power (EIRP) for MPE compliance is 10 dBm, which is so low that a UE transmission (Tx) power may need to be backed-off by more than 20 dB. In doing so, the UE range is significantly impacted by the PBO, and a reduction of 20 dB PBO reduces the UE range by up to 90%. The PBO also throttles transmit power of UEs, which are in power limitation or close to it (e.g., cell edge UEs, non-line-of-sight (NLOS) scenarios, etc.), and thereby reduces the power received by the gNB. Consequently the uplink (UL) signal to interference plus noise ratio (SINR) may also be reduced, which may ultimately lead to UL failures.

Figure 1:
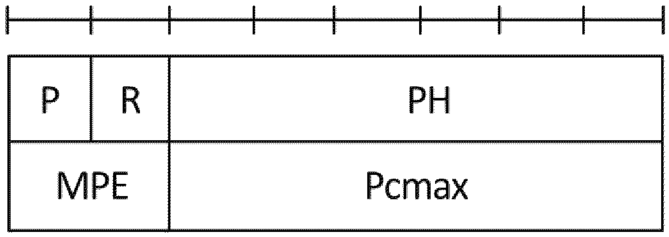
FIG. 1 illustrates an example application of power management-maximum power reduction (P-MPR).

FIG. 1 illustrates an example application of power management-maximum power reduction (P-MPR). $3^{rd}$ Generation Partnership Project (3GPP) specifies that when an MPE event is triggered at the UE, the UE may apply P-MPR, and report power headroom report (PHR), which may include P-MPR information, on the serving link to the network. An MPE event may refer to a situation where the UE has to reduce its output power because there is a user located on the communication path. To protect the user, MPE regulation limits the allowed output power from the UE. This is shown in FIG. 1 under frequency range 2 (FR2) for a single-entry PHR, which may be similarly applied for multi-entry PHR except more per-cell information may be included. In some cases, the P-MPR values may be defined as 3≤P-MPR<6, 6≤P-MPR<9, 9≤P-MPR≤12, P-MPR≥12. A UE condition may affect a pool of active/configured UL transmission configuration indicator (TCI) states and not downlink (DL) (e.g. MPE, non-correspondence between Rx & Tx chains, others). Thus, the gNB may schedule an SRS sweep to find a new UL TCI state, and switch state.

In a mmW system, as the radio condition worsens, the current beam may become invalid and the gNB may continue scheduling SRS sweeps to switch the UL beam. This default mechanism is time and resource consuming. Thus, to limit the SRS sweeps, the gNB may rank the different TCI states of the SRS sweep. However, there is no guarantee that the next beam is the next best one, as user movement is unpredictable and in the near-field of the antenna in FR2. Thus, the SRS ranking may become invalid because of a condition only known at the UE (e.g. user movement direction detected with MPE proximity sensors). As such, the gNB does not know when the ranking is no longer valid, and autonomous beam switch may lead to failures. Furthermore, in order to update the ranking, the gNB may still need to schedule a full SRS sweep, and no resources are saved.

Certain example embodiments may target SRS beams' hierarchical ranking. For instance, according to certain example embodiments, the SRS ranking may be performed by grouping the UL TCI states, which may result in a hierarchical structure. In certain example embodiments, the hierarchical structure may include an ordering of SRS signals based on one or more criterion, forming an SRS group. In other example embodiments, the hierarchical structure may also include SRS groups that are ordered between them. In other words, there may be an order of SRS groups where one or more SRS groups may be ordered higher or lower than one or more other SRS groups.

In certain example embodiments, grouping may be performed at the UE, for example, grouping per UE panel. In addition, a ranking criterion may correspond to downlink reference signal received power (RSRP) or SINR. In other example embodiments, the criterion may include beams suffering MPE, and beams not suffering MPE. According to certain example embodiments, within this, there may be ranking following a level of power back-off to comply with MPR (i.e., P-MPR level). In other example embodiments, the criterion for grouping and ranking may be different. For example, there may be grouping with Rx beam at the gNB and ranking with UL RSRP/SINR, or grouping with the UE panel at the UE and ranking with P-MPR. However, there may also be certain example embodiments, where the criterion is the same for both grouping and ranking.

According to other example embodiments, the grouping may also be performed at the gNB. For example, the grouping may follow a gNB receive beam and ranking with UL RSRP/SINR, or grouping following MPE events (e.g., in case it is on multiple beams from different UE panels). In other example embodiments, the grouping may be performed by the gNB based on an initial grouping/ranking input from the UE, and enhanced with gNB UL knowledge. Additionally, other example embodiments may include options where the gNB performs the grouping and the UE performs the ranking (with P-MPR), or vice versa where the UE performs the grouping (e.g., with panels) and the gNB performs the ranking (e.g., with UL RSRP/SINR).

According to certain example embodiments, with the hierarchical structure, the UE may indicate when the existing/current ranking is no longer valid, or when part of the ranking is no longer valid (i.e., ranking inside a group is no longer valid or ranking of groups is no longer valid). Thus, in certain example embodiments, the gNB may invalidate the ranking of just a group of UL TCI states from the SRS sweep. Additionally, in other example embodiments, the grouping may be performed at the UE and/or at the gNB (e.g., wide vs channel state information (CSI) beams). Certain example embodiments may also form a group by a single beam.

In certain example embodiments, a feature of time validity may be implemented with the ranking of the groups and the ranking inside each group. For example, in some example embodiments, there may be a time validity per group estimated by the gNB, which may be signaled from the gNB to the UE. In certain example embodiments, the time validity may correspond to an amount of time that the grouping is valid for x slots, and the ranking within a group is valid for y slots. Additionally, in other example embodiments, the UE or the gNB may set the time validity depending on, for example, channel staticity (seen by the UE and gNB). The UE or the gNB may also invalidate only the validity of x or only the validity of y, or both. In other example embodiments, the UE may invalidate based on sensors (e.g., proximity sensors for blockage and MPE, or orientation sensor such as a gyroscope for UE rotation or UE power delay profile for detecting multi-cluster dynamic channel profile).

According to certain example embodiments, timelines may be defined per Rx beam at the gNB (in case multiple Rx beams at the gNB). The UE may indicate that the time validity of a group of beams is invalid. As such, the gNB may update SRS ranking(s) by scheduling a subset of the entire SRS sweep, such as, for example, an SRS sweep inside a group. However, in other example embodiments, the UE may indicate a new "next best beam" (e.g., a preferred beam) or "next best group of beams" (e.g., a preferred group) out of the pool of beams to the gNB. Alternatively, in some example embodiments, the UE may indicate a new ranking for a group, or for the entire pool of UL TCI states.

In certain example embodiments, from the UE perspective determination of the "next best beam" or the "next best group of beams," may correspond to the next smallest P-MPR value in MPE scenarios, or it may be the next best RSRP value. The UE may also optimize the next best beam for power consumption, for example, by keeping only a single active panel, and choosing the best link budget (RSRP/SINR) seen from that panel.

Figure 2:
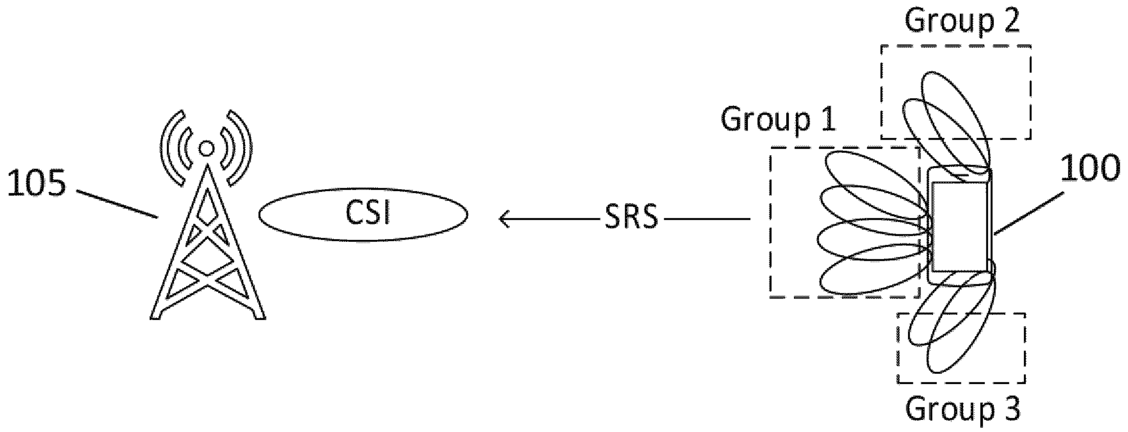
FIG. 2 illustrates an example sounding reference signal (SRS) grouping performed by a user equipment (UE), according to certain example embodiments.

FIG. 2 illustrates an example SRS grouping performed by the UE, according to certain example embodiments. In particular, the example of FIG. 2 illustrates SRS grouping being performed by the UE 100 including, for example, a per UE panel grouping. The per UE panel grouping may involve the UE grouping that follows the UE panels (e.g., a UE with 4 panels may have 4 groups). In other example embodiments, the UE panel grouping may follow P-MPR. According to certain example embodiments, there may also be 3 groups, one with P-MPR 3 dB, one with P-MPR 6 dB, and one with P-MPR 9 dB among only 2 panels, depending on how the user hand is located, and what beams it is covering across panels. In the example of FIG. 2, the UE 100 may form three groups of SRS beams (e.g., Group 1, Group 2, and Group 3). Once the SRS groups are formed, the UE may inform the gNB 105 of the groups, the order of the SRS signals within each group, and the order between each of the SRS groups.

Figure 3:
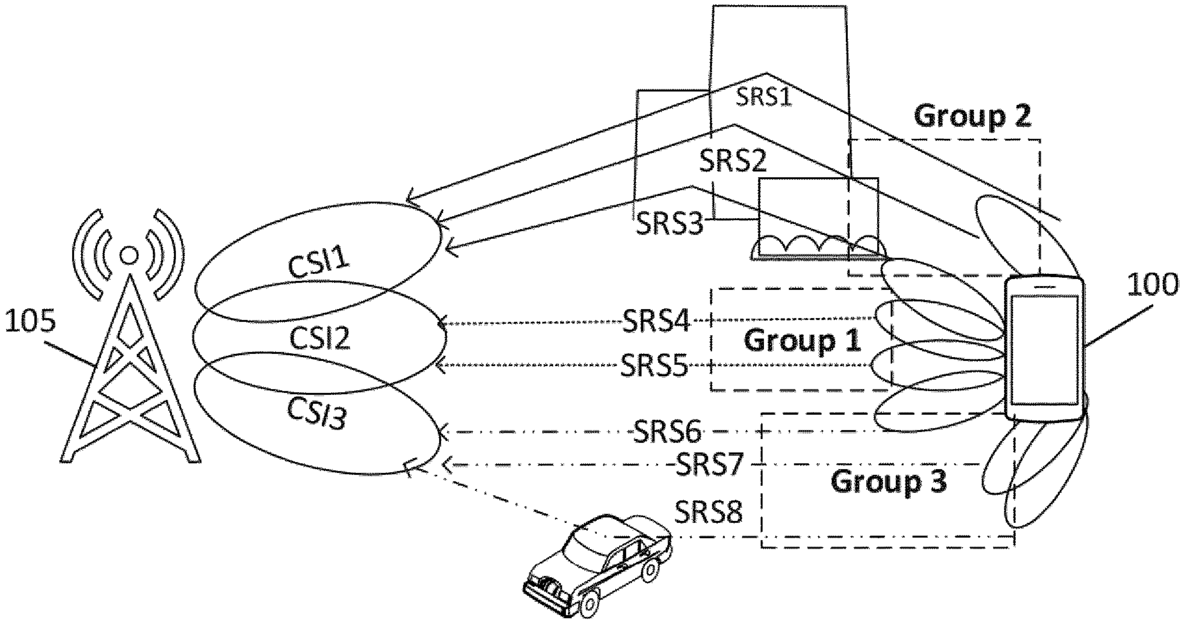
FIG. 3 illustrates an example SRS grouping performed by the gNB, according to certain example embodiments.
Figure 4:
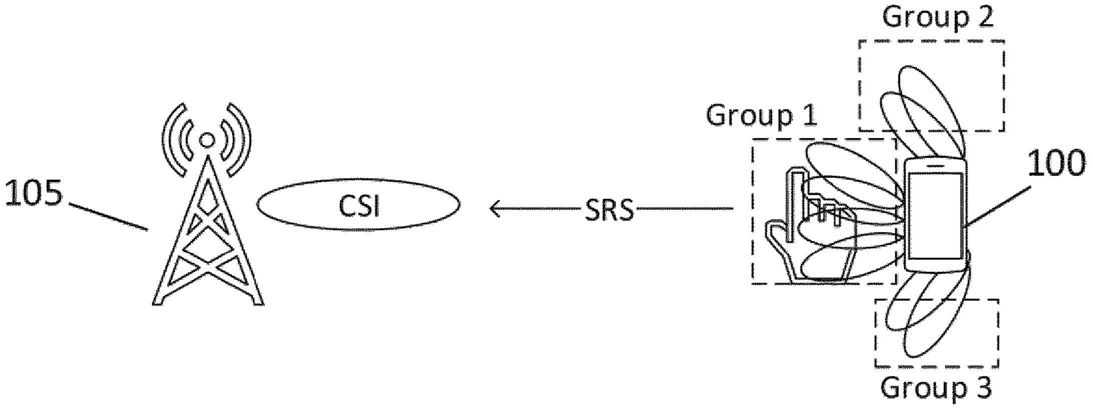
FIG. 4 illustrates an example case of a panel blockage, according to certain example embodiments.

FIG. 3 illustrates an example SRS grouping performed by the gNB, according to certain example embodiments. In particular, the example of FIG. 3 illustrates SRS grouping being performed by the gNB 105 including, for example, a per gNB Rx beam, where the gNB may use various metric for SRS grouping such as received RSRP, timing, and others. As to timing, the gNB may receive different beams from different angular directions (e.g., some in LOS and some in NLOS). The different beams may follow different paths, and therefore arrive with a different delay at the gNB. Thus, the gNB grouping may be performed according to the delay. According to certain example embodiments, in each case, the gNB may rank the SRS groups and then further rank the SRS beams inside the SRS groups. As a result, the gNB may invalidate either the ranking of the groups, or the ranking inside one or more of the groups (e.g., following an MPE event on a single UE panel). Thus, in certain example embodiments, in order to update the SRS ranking, the gNB may not need to schedule an entire SRS sweep, but may request a reduced sweep such as, for example, inside a particular SRS group. In some example embodiments, the sweep may be optimized by, for example, performing a mini-sweep, which can reduce the resources used for UL beam management. FIG. 4 illustrates an example case of a panel blockage, according to certain example embodiments. As illustrated in the example of FIG. 4, a hand or other object may block a panel of the UE 100. In certain example embodiments, with a UE grouping, the gNB 105 may schedule a mini-sweep of SRS for beams inside group 1 (seen from the same UE panel).

Figure 5:
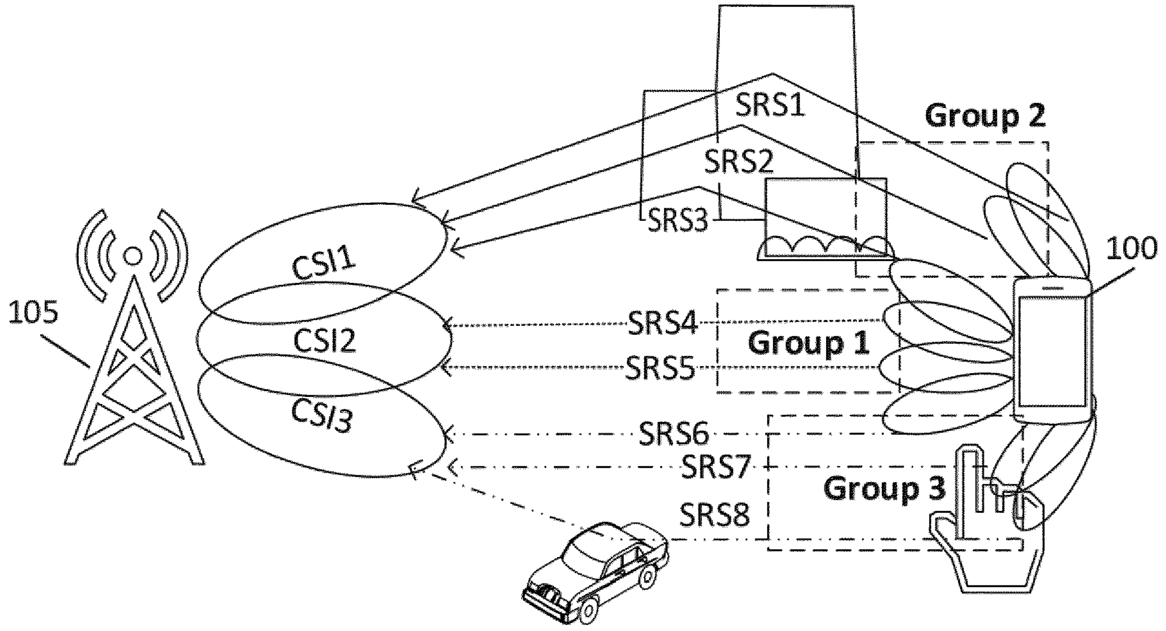
FIG. 5 illustrates an example case of a multiple panel blockage, according to certain example embodiments.

FIG. 5 illustrates an example case of a multiple panel blockage, according to certain example embodiments. For instance, in some example embodiments, the hand may cover a direction seen from multiple panels of the UE 100. With a gNB grouping, the gNB 105 may schedule a mini-sweep of SRS for beams inside group 3 (seen from gNB CSI3). According to certain example embodiments, the gNB 105 may add a validity timeline/timer per group including, for example line of sight (LOS) links (e.g., group 1 received on CSI2) may be more sustainable than NLOS links (e.g., group 3 received on CSI3). Additionally, different validity timelines/timers may be associated with the different groups, and to whether the grouping is UE-based or gNB Rx based.

Figure 6:
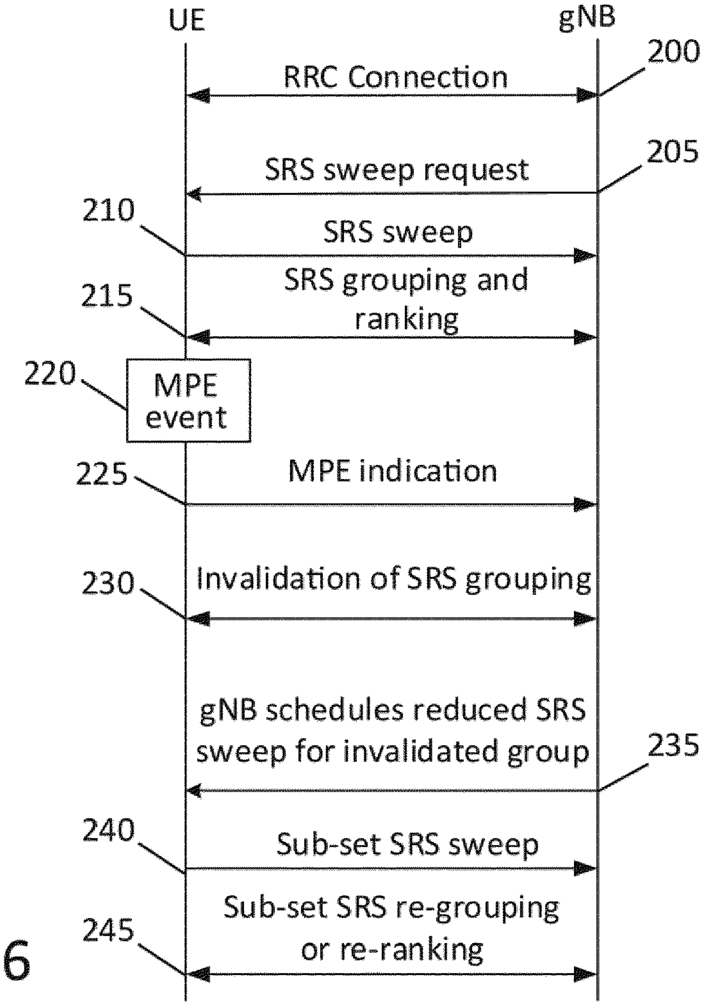
FIG. 6 illustrates an example signal diagram, according to certain example embodiments.

FIG. 6 illustrates an example signal diagram, according to certain example embodiments. In particular, FIG. 6 illustrates an example signal diagram for the UE-based SRS grouping. At 200, the UE may be connected to the gNB via a radio resource control (RRC) connection. At 205, the gNB may transmit an SRS sweep request to the UE in search of a suitable UL beam to switch to. In response to the SRS sweep request, at 210, the UE may perform an SRS sweep, and send an SRS sequence from each of its beams to the gNB. At 215, the UE may perform the grouping of SRS signals and SRS groups, and rank the SRS beams and the SRS groups, and transmit the results/information of the groupings and rankings to the gNB. In other example embodiments, the gNB may perform the grouping of SRS signals and SRS groups, and rank the SRS beams and the SRS groups, and transmit the results/information of the groupings and rankings to the UE.

At 220, an MPE event may occur. For instance, in certain example embodiments, an object (e.g., a hand, or other physical object) may be covering a panel of the UE. At 225, the UE may inform the gNB of the MPE event in a Power Headroom Report (PHR) and of the power back-off level with the Power management Maximum Power Reduction (P-MPR). As a result, at 230, the UE may transmit an indication to the gNB identifying which ranking is no longer valid, or when part of the ranking is no longer valid (i.e., ranking inside a group is no longer valid, or ranking of groups is no longer valid). In other example embodiments, such grouping or timing invalidation may also be indicated from the network (e.g, gNB) to the UE as a response to the MPE report. In further example embodiments, SRS in validation, grouping, or ranking may be performed based on a predicted MPE event, which may enable the UE to function proactively, and avoid potential failure due to an actual MPE event. In response, at 235, the gNB may schedule a reduced SRS sweep (e.g., mini-sweep) for the invalidated group at the UE. According to certain example embodiments, the gNB may not rely on a previous grouping or ranking, and therefore may re-schedule an SRS sweep. However, in certain example embodiments, the gNB may optimize the resources spent for the SRS sweep by performing a mini-sweep, and only re-scheduling the beams that were invalidated. Further, the UE may send the SRS sweep (i.e., one SRS per beam).

At 240, the UE may perform the scheduled SRS sweep requested by the gNB. In this case, the UE may transmit the sweep (i.e., UL transmission) to the gNB. Optionally, in other example embodiments, the UE may also perform a new mini-grouping and mini-ranking of the beams that were previously invalidated (e.g., according to P-MPR). Alternatively, in some example embodiments, the UE may just perform the mini-sweep, and the UE or the gNB may, at 245, re-rank or re-group according to, for example, RSRP/SINR.

Figure 7:
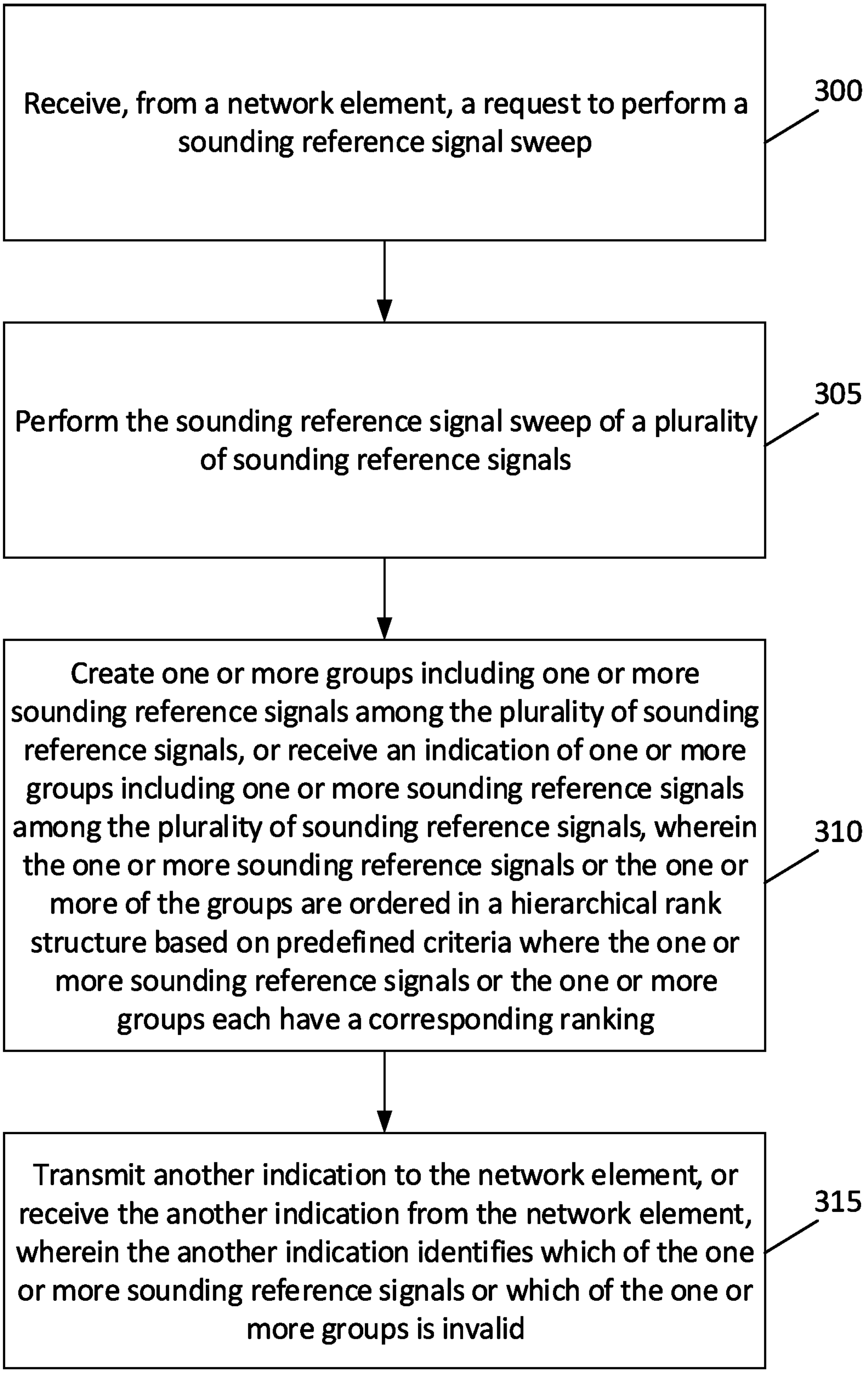
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a UE, for instance, similar to apparatuses 10 or 20 illustrated in FIG. 9(*a*) or 9(*b*).

According to certain example embodiments, the method of FIG. 7 may include, at 300, receiving, from a network element, a request to perform a sounding reference signal sweep. At 305, the method may include performing the sounding reference signal sweep of a plurality of sounding reference signals. At 310, the method may include creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. At 315, the method may transmitting another indication to the network element, or receiving the another indication from the network element. According to certain example embodiments, the another indication may identify which of the one or more sounding reference signals or which of the one or more groups is invalid.

According to certain example embodiments, the predefined criteria may include at least one of a reference signal received power, a signal to interference plus noise ratio, and a maximum permissible exposure event severity. According to other example embodiments, the method may also include determining that the ranking of the one or more sounding reference signals, or the ranking of the one or more groups is invalid during a maximum permissible exposure event. According to further example embodiments, the method may include setting a time validity for the one or more reference signals and the one or more groups, and indicating that the time validity of the one or more groups is invalid. In certain example embodiments, the time validity may be a hierarchical time validity that is applicable to the ranking of the one or more groups, or the ranking of the one or more sounding reference signals. In some example embodiments, the method may further include receiving a schedule for a reduced sounding reference signal sweep of the one or more groups that is no longer valid, and performing the reduced sounding reference signal sweep of the invalidated group in response to the schedule.

In certain example embodiments, the method may also include performing a mini-grouping and a mini-ranking of the one or more sounding reference signals that were previously invalidated, or performing a mini-sweep and re-ranking or regrouping the one or more sounding reference signals or the one or more groups. In other example embodiments, the method may further include indicating a preferred sounding reference signal, a preferred group, or a new ranking of the one or more groups or the one or more sounding reference signals.

Figure 8:
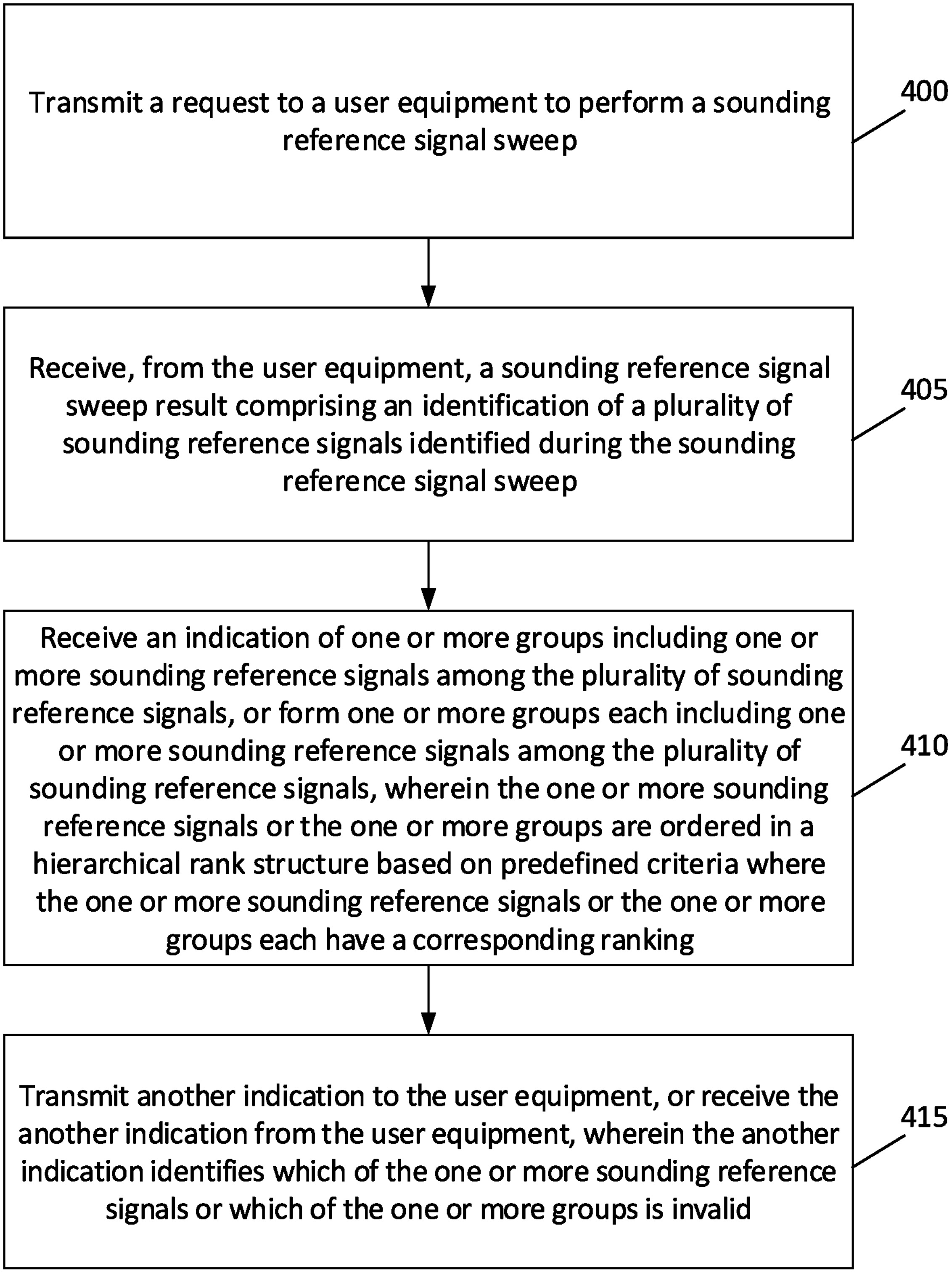
FIG. 8 illustrates an example flow diagram of another method, according to certain example embodiments.

FIG. 8 illustrates an example flow diagram of another method, according to certain example embodiments. In an example embodiment, the method of FIG. 8 may be performed by a network entity, network node, or a group of multiple network elements in a 3GPP system, such as LTE or 5G-NR. For instance, in an example embodiment, the method of FIG. 8 may be performed by a gNB, for instance, similar to apparatuses 10 or 20 illustrated in FIG. 9(*a*) or 9(*b*).

According to certain example embodiments, the method of FIG. 8 may include, at 400, the method may include transmitting a request to a user equipment to perform a sounding reference signal sweep. At 405, the method may include receiving, from the user equipment, a sounding reference signal sweep result comprising an identification of a plurality of sounding reference signals identified during the sounding reference signal sweep. At 410, the method may include receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. At 415, the method may include transmitting another indication to the user equipment, or receiving the another indication from the user equipment. In certain example embodiments, the another indication may identify which of the one or more sounding reference signals or which of the one or more groups is invalid.

According to certain example embodiments, the predefined criteria may include at least one of a reference signal received power, a signal to interference plus noise ratio, and a maximum permissible exposure event severity. According to other example embodiments, the method may include determining that the ranking of the one or more sounding reference signals, or the ranking of the one or more groups is invalid during a maximum permissible exposure event. In certain example embodiments, the method may further include scheduling a reduced sounding reference signal sweep of the one or more groups that is invalid, and receiving a result of the reduced sounding reference signal sweep. In other example embodiments, the method may also include updating the ranking of the one or more sounding reference signals based on the result of the reduced sounding reference signal sweep. In some example embodiments, the method may further include adding a time validity to the one or more groups that defines a time period for which the ranking of the one or more groups is valid. According to certain example embodiments, the time validity may be a hierarchical time validity that is applicable to the ranking of the one or more groups, or the ranking of the one or more sounding reference signals.

Figure 9A:
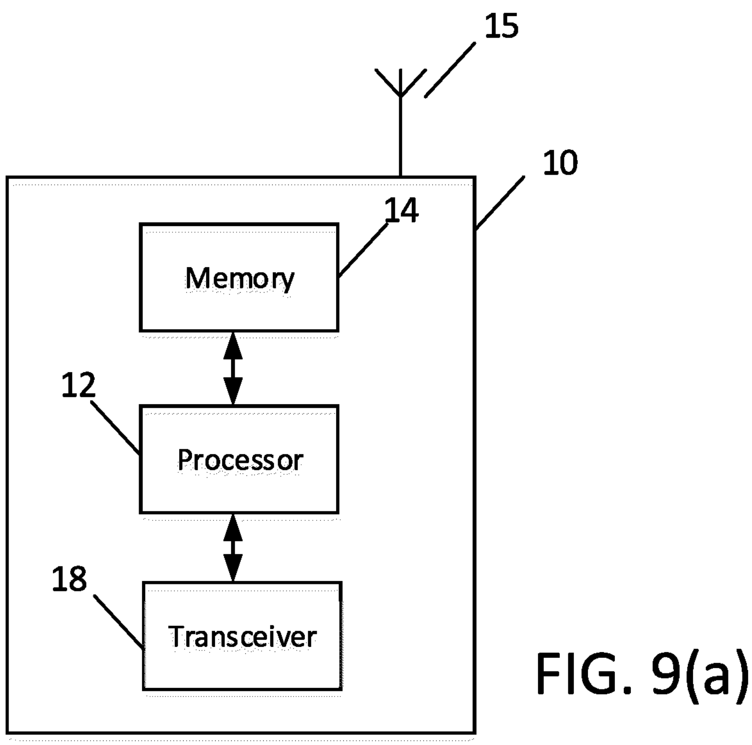
FIG. 9(*a*) illustrates an apparatus, according to certain example embodiments.
Figure 9B:
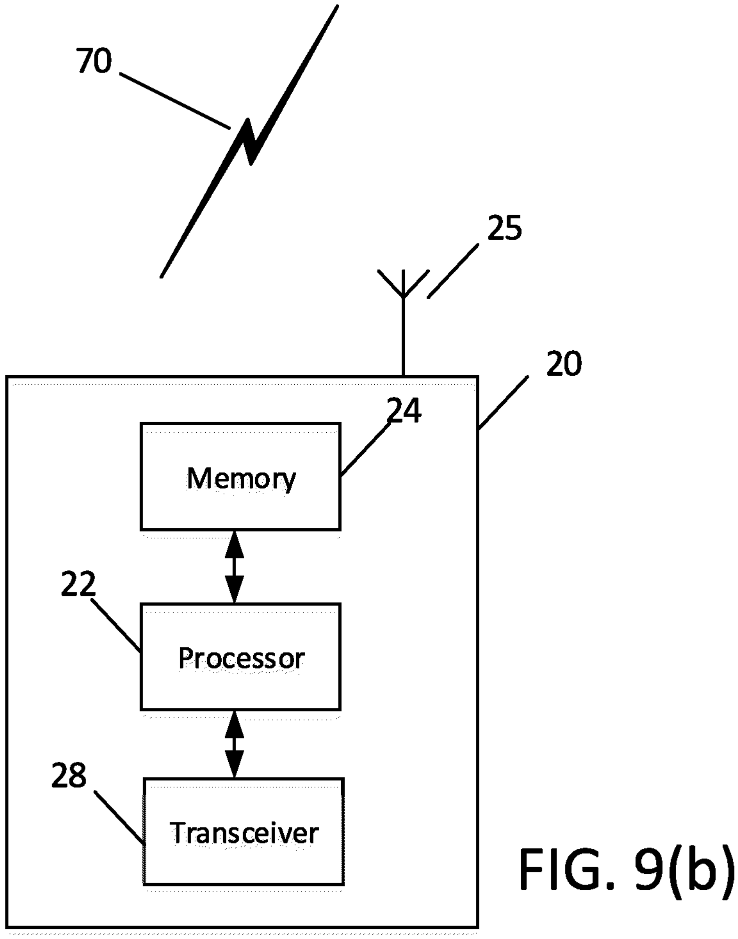

FIG. 9(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 9(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 10 may include components or features not shown in FIG. 9(*a*).

As illustrated in the example of FIG. 9(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive, from a network element, a request to perform a sounding reference signal sweep. Apparatus 10 may also be controlled by memory 14 and processor 12 to perform the sounding reference signal sweep of a plurality of sounding reference signals. Apparatus 10 may further be controlled by memory 14 and processor 12 to create one or more groups including one or more sounding reference signals among the plurality of sounding reference signals, or receive an indication of one or more groups including one or more sounding reference signals among the plurality of sounding reference signals. In certain example embodiments, the one or more sounding reference signals or the one or more of the groups may be ordered in a hierarchical rank structure based on predefined criteria where the one or more sounding reference signals or the one or more groups each have a corresponding ranking. In addition, apparatus 10 may be controlled by memory 14 and processor 12 to transmit another indication to the network element, or receive the another indication from the network element. In certain example embodiments, the another indication may identify which of the one or more sounding reference signals or which of the one or more groups is invalid.

FIG. 9(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, and/or WLAN access point, associated with a radio access network (RAN), such as an LTE network, 5G or NR. It should be noted that one of ordinary skill in the art would understand that apparatus 20 may include components or features not shown in FIG. 9(*b*).

As illustrated in the example of FIG. 9(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to transmit a request to a user equipment to perform a sounding reference signal sweep. Apparatus 20 may also be controlled by memory 24 and processor 22 to receive, from the user equipment, a sounding reference signal sweep result including an identification of a plurality of sounding reference signals identified during the sounding reference signal sweep. Apparatus 20 may further be controlled by memory 24 and processor 22 to receive an indication of one or more groups including one or more sounding reference signals among the plurality of sounding reference signals, or form one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. Further, apparatus 20 may be controlled by memory 14 and processor 22 to transmit another indication to the user equipment, or receive the another indication from the user equipment. In certain example embodiments, the another indication may identify which of the one or more sounding reference signals or which of the one or more groups is invalid.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for receiving, from a network element, a request to perform a sounding reference signal sweep. The apparatus may also include means for performing the sounding reference signal sweep of a plurality of sounding reference signals. The apparatus may further include means for means for creating one or more groups including one or more sounding reference signals among the plurality of sounding reference signals, or receiving an indication of one or more groups including one or more sounding reference signals among the plurality of sounding reference signals. In certain example embodiments, the one or more sounding reference signals or the one or more of the groups are ordered in a hierarchical rank structure based on predefined criteria where the one or more sounding reference signals or the one or more groups each have a corresponding ranking. In addition, the apparatus may include means for means for transmitting another indication to the network element, or receiving the another indication from the network element. In certain example embodiments, the another indication identifies which of the one or more sounding reference signals or which of the one or more groups is invalid.

Other example embodiments may be directed to an apparatus that includes means for transmitting a request to a user equipment to perform a sounding reference signal sweep. The apparatus may also include means for receiving, from the user equipment, a sounding reference signal sweep result including an identification of a plurality of sounding reference signals identified during the sounding reference signal sweep. The apparatus may further include means for receiving an indication of one or more groups including one or more sounding reference signals among the plurality of sounding reference signals, or forming one or more groups each including one or more sounding reference signals among the plurality of sounding reference signals. In certain example embodiments, the one or more sounding reference signals or the one or more groups may be ordered in a hierarchical rank structure based on predefined criteria where the one or more sounding reference signals or the one or more groups each have a corresponding ranking. In addition, the apparatus may include means for transmitting another indication to the user equipment, or receiving the another indication from the user equipment. In certain example embodiments, the another indication may identify which of the one or more sounding reference signals or which of the one or more groups is invalid.

Certain example embodiments described herein provide several technical improvements, enhancements, and/or advantages. In some example embodiments, it may be possible to enable UE initiated beam switch. Other example embodiments may enable UL beam management (whether UL is independent from DL, or whether DL is then based on UL) while minimizing overhead. In addition, certain example embodiments may reduce beam switch latency, and improve UE power consumption from scheduling less SRS sweeps. Certain example embodiments may also enable saving resources by only utilizing aperiodic SRS sweeps instead of periodic or semi-persistent sweeps, and reducing a need for SRS for UL beam management by using ranking and a validity time. Additional example embodiments may provide a more robust approach to UE blockage issues.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
|---|---|
| 3GPP | 3rd Generation Partnership Project |
| 5G | 5th Generation |
| 5GCN | 5G Core Network |
| BS | Base Station |
| eNB | Enhanced Node B |
| gNB | 5G or Next Generation NodeB |
| LTE | Long Term Evolution |
| MPE | Maximum Permissible Exposure |
| NR | New Radio |
| PBO | Power Back-Off |
| P-MPR | Power Management - Maximum Power Reduction |
| QCL | Quasi Co-Location |
| SRS | Sounding Reference Signal |
| TCI | Transmission Configuration Indicator |
| UE | User Equipment |

We claim:

1. An apparatus, comprising:

at least one processor; and at least one memory storing instructions that, when executed with the at least one processor, cause the apparatus at least to:

receive, from a network element, a request to perform a sounding reference signal sweep;

perform the sounding reference signal sweep of a plurality of sounding reference signals;

create one or more groups comprising one or more sounding reference signals among the plurality of sounding reference signals, or receive an indication of the one or more groups comprising the one or more sounding reference signals among the plurality of sounding reference signals, wherein the plurality of sounding reference signals are identified during the sounding reference signal sweep, wherein the one or more sounding reference signals or the one or more groups are ordered in a hierarchical rank structure based on predefined criteria where the one or more sounding reference signals or the one or more groups respectively have a corresponding ranking; and transmit another indication to the network element, or receive the another indication from the network element, wherein the another indication identifies which of the one or more sounding reference signals or which of the one or more groups is invalid.

2. The apparatus according to claim 1, wherein the predefined criteria comprises at least one of:

a reference signal received power, a signal to interference plus noise ratio, or a maximum permissible exposure event severity.

3. The apparatus according to claim 1, wherein the at least one memory stores instructions that, when executed with the at least one processor, cause the apparatus at least to:

determine that the ranking of the one or more sounding reference signals, or the ranking of the one or more groups is invalid during a maximum permissible exposure event.

4. The apparatus according to claim 1, wherein the at least one memory stores instructions that, when executed with the at least one processor, cause the apparatus at least to:

set a time validity for the one or more reference signals and the one or more groups; and indicate that the time validity of the one or more groups is invalid, wherein the time validity is a hierarchical time validity that is applicable to the ranking of the one or more groups, or the ranking of the one or more sounding reference signals.

5. The apparatus according to claim 1, wherein the at least one memory stores instructions that, when executed with the at least one processor, cause the apparatus at least to:

receive a schedule for a reduced sounding reference signal sweep of at least one of the one or more groups that is no longer valid; and perform the reduced sounding reference signal sweep of the at least one invalidated group in response to the schedule.

6. The apparatus according to claim 5, wherein the at least one memory stores instructions that, when executed with the at least one processor, cause the apparatus at least to:

perform a grouping and a ranking of at least one of the one or more sounding reference signals that were previously invalidated; or perform a mini-sweep and re-ranking or regrouping of the one or more sounding reference signals or the one or more groups.

7. The apparatus according to claim 1, wherein the at least one memory stores instructions that, when executed with the at least one processor, cause the apparatus at least to:

indicate a preferred sounding reference signal, a preferred group, or a new ranking of the one or more groups or the one or more sounding reference signals.

8. An apparatus, comprising:

at least one processor; and at least one memory storing instructions that, when executed with the at least one processor, cause the apparatus at least to:

transmit a request to a user equipment to perform a sounding reference signal sweep;

receive, from the user equipment, a sounding reference signal sweep result comprising an identification of a plurality of sounding reference signals identified during the sounding reference signal sweep;

receive an indication of one or more groups comprising one or more sounding reference signals among the plurality of sounding reference signals, or form the one or more groups comprising the one or more sounding reference signals among the plurality of sounding reference signals, wherein the one or more sounding reference signals or the one or more groups are ordered in a hierarchical rank structure based on predefined criteria where the one or more sounding reference signals or the one or more groups respectively have a corresponding ranking; and transmit another indication to the user equipment, or receive the another indication from the user equipment, wherein the another indication identifies which of the one or more sounding reference signals or which of the one or more groups is invalid.

9. The apparatus according to claim 8, wherein the predefined criteria comprises at least one of:

a reference signal received power, a signal to interference plus noise ratio, or a maximum permissible exposure event severity.

10. The apparatus according to claim 8, wherein the at least one memory stores instructions that, when executed with the at least one processor, cause the apparatus at least to:

determine that the ranking of the one or more sounding reference signals, or the ranking of the one or more groups is invalid during a maximum permissible exposure event.

11. The apparatus according to claim 8, wherein the at least one memory stores instructions that, when executed with the at least one processor, cause the apparatus at least to:

schedule a reduced sounding reference signal sweep of at least one of the one or more groups that is invalid; and receive a result of the reduced sounding reference signal sweep.

12. The apparatus according to claim 11, wherein the at least one memory stores instructions that, when executed with the at least one processor, cause the apparatus at least to:

update the ranking of the one or more sounding reference signals based on the result of the reduced sounding reference signal sweep.

13. The apparatus according to claim 8, wherein the at least one memory stores instructions that, when executed with the at least one processor, cause the apparatus at least to:

add a time validity to the one or more groups that defines a time period for which the ranking of the one or more groups is valid, wherein the time validity is a hierarchical time validity that is applicable to the ranking of the one or more groups, or the ranking of the one or more sounding reference signals.

14. A method, comprising:

receiving, from a network element, a request to perform a sounding reference signal sweep;

performing the sounding reference signal sweep of a plurality of sounding reference signals;

creating one or more groups comprising one or more sounding reference signals among the plurality of sounding reference signals, or receiving an indication of the one or more groups comprising the one or more sounding reference signals among the plurality of sounding reference signals, wherein the plurality of sounding reference signals are identified during the sounding reference signal sweep, wherein the one or more sounding reference signals or the one or more of the groups are ordered in a hierarchical rank structure based on predefined criteria where the one or more sounding reference signals or the one or more groups respectively have a corresponding ranking; and transmitting another indication to the network element, or receiving the another indication from the network element, wherein the another indication identifies which of the one or more sounding reference signals or which of the one or more groups is invalid.

15. The method according to claim 14, wherein the predefined criteria comprises at least one of:

a reference signal received power, a signal to interference plus noise ratio, or a maximum permissible exposure event severity.

16. The method according to claim 14, further comprising:

determining that the ranking of the one or more sounding reference signals, or the ranking of the one or more groups is invalid during a maximum permissible exposure event.

17. The method according to claim 14, further comprising:

setting a time validity for the one or more reference signals and the one or more groups; and indicating that the time validity of the one or more groups is invalid, wherein the time validity is a hierarchical time validity that is applicable to the ranking of the one or more groups, or the ranking of the one or more sounding reference signals.

18. The method according to claim 14, further comprising:

receiving a schedule for a reduced sounding reference signal sweep of at least one of the one or more groups that is no longer valid; and performing the reduced sounding reference signal sweep of the at least one invalidated group in response to the schedule.

19. The method according to claim 18, further comprising:

performing a grouping and a ranking of at least one of the one or more sounding reference signals that were previously invalidated; or performing a mini-sweep and re-ranking or regrouping of the one or more sounding reference signals or the one or more groups.

20. The method according to claim 14, further comprising:

indicating a preferred sounding reference signal, a preferred group, or a new ranking of the one or more groups or the one or more sounding reference signals.

* * * * *